(12) United States Patent
Miller et al.

(10) Patent No.: US 7,765,552 B2
(45) Date of Patent: Jul. 27, 2010

(54) SYSTEM AND METHOD FOR ALLOCATING COMPUTING RESOURCES FOR A GRID VIRTUAL SYSTEM

(75) Inventors: Troy D. Miller, Plano, TX (US); Isom Lawrence Crawford, Jr., Royse City, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1310 days.

(21) Appl. No.: 10/944,227

(22) Filed: Sep. 17, 2004

(65) Prior Publication Data

US 2006/0064698 A1 Mar. 23, 2006

(51) Int. Cl.
*G06F 9/46* (2006.01)
*G06F 15/173* (2006.01)

(52) U.S. Cl. ............... 718/104; 718/100; 718/102; 709/224; 709/226

(58) Field of Classification Search ............ 718/100, 718/102, 104; 709/202, 216, 224, 225, 226; 707/101

See application file for complete search history.

(56) References Cited

U.S. PATENT DOCUMENTS

| | | | | |
|---|---|---|---|---|
| 5,790,895 | A * | 8/1998 | Krontz et al. | 710/64 |
| 5,991,793 | A * | 11/1999 | Mukaida et al. | 718/104 |
| 6,075,938 | A * | 6/2000 | Bugnion et al. | 703/27 |
| 6,370,560 | B1 | 4/2002 | Robertazzi et al. | |
| 6,654,783 | B1 * | 11/2003 | Hubbard | 709/202 |
| 7,140,020 | B2 * | 11/2006 | McCarthy et al. | 718/104 |
| 7,290,028 | B2 * | 10/2007 | Brabson et al. | 709/203 |
| 7,412,492 | B1 * | 8/2008 | Waldspurger | 709/216 |
| 7,421,402 | B2 * | 9/2008 | Chang et al. | 705/26 |
| 2003/0037092 | A1 * | 2/2003 | McCarthy et al. | 709/104 |
| 2003/0191795 | A1 | 10/2003 | Bernardin et al. | |
| 2005/0027863 | A1 * | 2/2005 | Talwar et al. | 709/226 |
| 2005/0027865 | A1 * | 2/2005 | Bozak et al. | 709/226 |
| 2005/0080696 | A1 * | 4/2005 | Bagchi et al. | 705/35 |
| 2005/0125537 | A1 * | 6/2005 | Martins et al. | 709/226 |
| 2005/0131898 | A1 * | 6/2005 | Fatula, Jr. | 707/8 |
| 2005/0138175 | A1 * | 6/2005 | Kumar et al. | 709/226 |
| 2005/0155033 | A1 * | 7/2005 | Luoffo et al. | 718/104 |
| 2005/0160413 | A1 * | 7/2005 | Broussard et al. | 717/148 |

(Continued)

FOREIGN PATENT DOCUMENTS

JP 2004-062911 2/2004

(Continued)

OTHER PUBLICATIONS

Yang et al., "Policy-based active grid management architecture", IEEE, 2002, pp. 243-248.*

(Continued)

*Primary Examiner*—Meng-Ai An
*Assistant Examiner*—Caroline Arcos

(57) ABSTRACT

In one embodiment, a method for allocating computing resources comprises executing a plurality of applications and a grid virtual system within a shared resource domain, assigning computing resources to the plurality of applications to process application transactions, dynamically reallocating computing resources associated with the plurality of applications to the grid virtual system when the computing resources are idle, registering availability of grid services in response to the reallocating, scheduling grid jobs for execution within the grid virtual system, and modifying at least one reallocation parameter in response to the scheduling.

20 Claims, 3 Drawing Sheets

U.S. PATENT DOCUMENTS

| | | | |
|---|---|---|---|
| 2005/0160423 A1* | 7/2005 | Bantz et al. | 718/1 |
| 2005/0165925 A1* | 7/2005 | Dan et al. | 709/224 |
| 2005/0198636 A1* | 9/2005 | Barsness et al. | 718/100 |
| 2006/0031242 A1* | 2/2006 | Hall et al. | 707/101 |
| 2006/0070067 A1* | 3/2006 | Lowery | 718/100 |
| 2006/0294238 A1* | 12/2006 | Naik et al. | 709/226 |

FOREIGN PATENT DOCUMENTS

| | | |
|---|---|---|
| WO | WO 01/14961 | 3/2001 |
| WO | WO 2005/059748 | 6/2005 |
| WO | WO 2005/069138 | 7/2005 |

OTHER PUBLICATIONS

Chase et al., "Dynamic virtual clusters in a grid site manager", IEEE, 2003, pp. 1-11.*

U.S. Appl. No. 10/206,594, filed Jul. 26, 2002, McCarthy.

Taniguchi, Hideo et al., "A method for configuring multiple operating systems non-sharing hardware", *Information Processing Society of Japan*, Aug. 21, 2002 vol. 2002, No. 79, (Aug. 21, 2002),47-54.

Breidenbach, Susan "Enterprise P2P front line", *Sun World*, IDC Japan, vol. 12, No. 2, (Feb. 1, 2002),48-55.

Sengoku, Makoto "Use that becomes clear through its essence", *Nikkei Byte*. Nikkei BP Inc., vol. 255, (Jul. 22, 2004),30-37.

Hashimoto, Hiroshi "New common knowledge of IT which it is too late to ask", *Nikkei Computer*, Nikkei BP Inc., vol. 591 (Jan. 12, 2004),98-101.

Chunlin Li & Layuan Li "A distributed decomposition policy for computational grid resource allocation optimization based on utility functions"—Microprocessors and Microsystems 29 (2005) 261-275- Note document received date of Jun. 24, 2004.

Kubicek et al "Dynamic allocation of servers to jobs in a grid hosting environment"—BT Technology Journal vol. 22 No. 3 Jul. 2004-pp. 251-260.

Casalicchio & Menasce—"QOS in Grid Computing"—IEEE Internet Computing Jul.-Aug. 2004 pp. 85-87.

Foreign Search Report issued for GB 0517470.1 dated Oct. 10, 2005.

* cited by examiner

SYSTEM AND METHOD FOR ALLOCATING COMPUTING RESOURCES FOR A GRID VIRTUAL SYSTEM

FIELD OF THE INVENTION

The present application is generally related to providing grid computing services.

DESCRIPTION OF RELATED ART

Grid computing involves sharing heterogenous resources based on different platforms to support distributed computing. At a conceptual level, grid computing may be analogized to the provision of power to household appliances. The metaphor is for computers to act as generators of computational "power," for applications to become computational "appliances," and for the software infrastructure to act as the utility responsible for managing the interaction between them. To facilitate such a provision of computing resources, the hardware and software supporting a grid are provided with some level of "assurance" of availability and standard interfaces to the grid exposed to consuming applications.

Grid computing typically involves virtualization of computer resources and making services available to access the virtual resources through suitable interfaces. For example, the open source Globus Toolkit provides a software framework for the construction of grid systems according to an Open Grid Services architecture (OGSA). Many types of distributed applications may take advantage of resources made available by such grid systems to execute portions of code in parallel using the exposed interfaces. An example of a distributed/parallel application using grid functionality is the Network for Earthquake Engineering Simulation (NEESgrid) application.

OSGA grid systems provide a number of mechanisms for publishing the availability of grid services, for enabling the grid services to be accessed, and for performing lifetime management of instances of grid services. Specifically, the OSGA model enables a grid system to store service identifying information in a registry server. Applications seeking to instantiate a service may query the registry server to identify available services and to determine the characteristics of those services. Upon location of suitable services, an application may create instances of services to obtain the virtual resources requested by the application. The instantiated services may be maintained during use, may communicate notification messages, and may be subjected to management operations using various OSGA mechanisms. At suitable times, the instantiated services may also be terminated or destroyed according to OSGA mechanisms.

SUMMARY

In one embodiment, a method for allocating computing resources comprises executing a plurality of applications and a grid virtual system within a shared resource domain, assigning computing resources to the plurality of applications to process application transactions, dynamically reallocating computing resources associated with the plurality of applications to the grid virtual system when the computing resources are idle, registering availability of grid services in response to the reallocating, scheduling grid jobs for execution within the grid virtual system, and modifying at least one reallocation parameter in response to the scheduling.

In another embodiment, a computing system comprises a plurality of computing resources, a plurality of applications, a grid virtual system, and a management process for allocating the plurality of computing resources between the plurality of applications and the grid system, wherein when the management process performs a change in computing resource allocation, the management process communicates a first message to a daemon associated with the grid virtual system, the daemon performs a grid registration operation in response to receiving the first message, the daemon communicates a second message to the management process in response to scheduling a grid job, and the management process reserves a computing resource for the grid virtual system in response to receiving the second message.

In another embodiment, a computer readable medium comprises code for creating a virtual grid system, wherein the virtual grid system provides access to virtual computing resources to grid applications via communication interfaces, code for dynamically allocating resources between a plurality of applications and the virtual grid system, and code for defining a grid system daemon to support operations associated with the virtual grid system, wherein when the code for dynamically allocating allocates resources to the virtual grid system, the grid system daemon registers availability of grid services for instantiation by a grid application, wherein when a grid application schedules a grid job for execution using an instantiated grid service, the grid system daemon communicates a message to the code for dynamically allocating and the code for dynamically allocating responds to the message by reserving resources with the virtual grid system to support the grid job.

DETAILED DESCRIPTION

Figure 1:
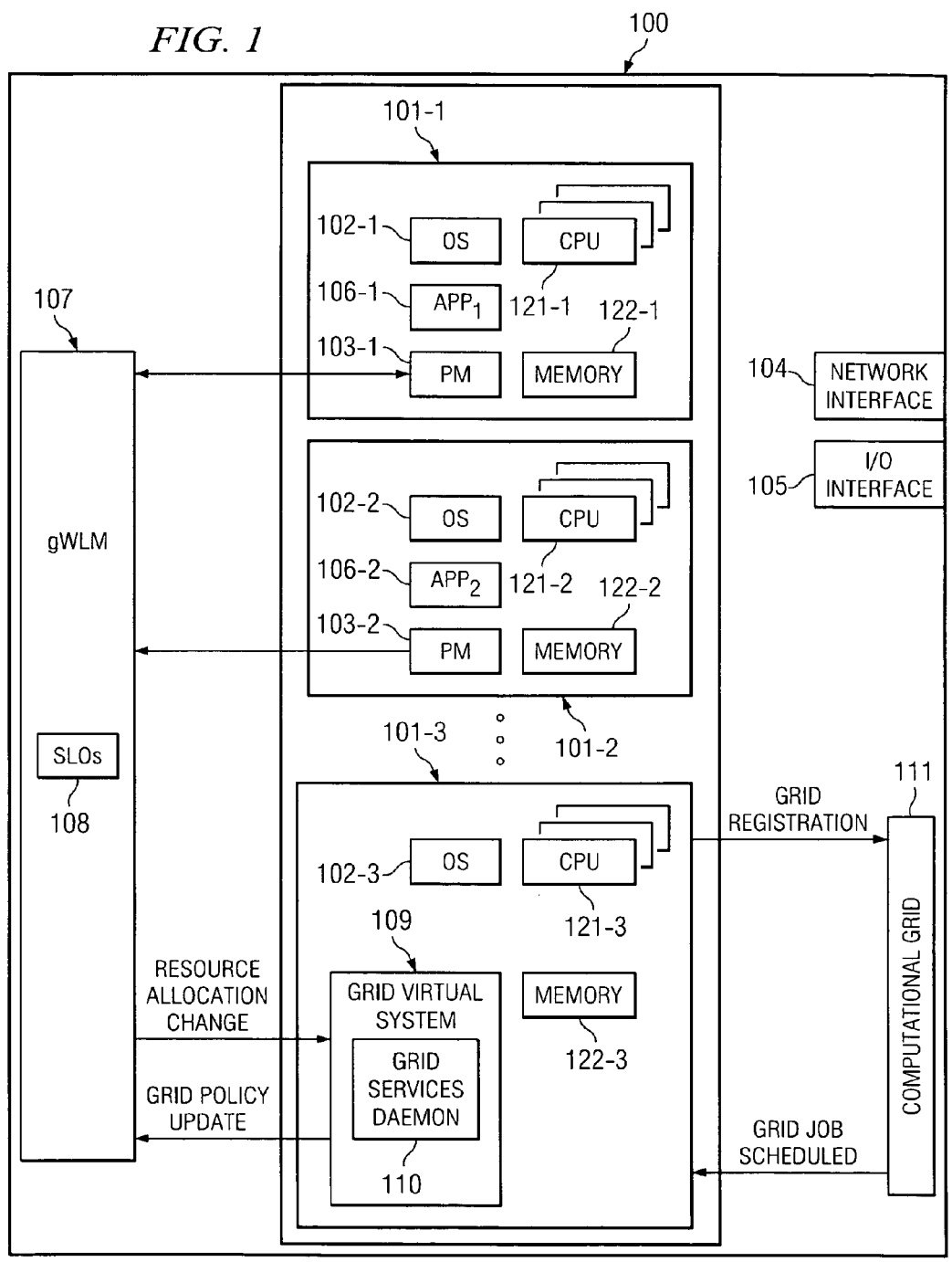
FIG. 1 depicts a system comprising a shared resource domain and a grid virtual system according to one representative embodiment.

Some representative embodiments are directed to systems and methods for making resources available from a shared resource domain to a grid system to support distributed applications. Referring now to the drawings, FIG. 1 depicts system 100 that dynamically allocates system resources within a shared resource domain according to one representative embodiment.

System 100 includes a plurality of protective domains 101-1 through 101-3. An example of a suitable protective domain is a virtual partition which virtualizes resources of a server platform and provides software isolation and desirable management characteristics. Partitions 101-1 through 101-3 form a shared resource domain, i.e., resources may be reallocated between the partitions. For example, processors 121 and specific portions of memory 122 of the server platform may be allocated between partitions 101-1 through 101-3. Partitions 101 may share other resources such as network interface 104 and input/output (IO) interface 105. Suitable queuing and scheduling mechanisms (not shown) may be used to allocate access to network interface 104 and IO interface 105 as examples. Although one representative embodiment is described as using virtual partitions, any suitable computing environment may be used to implement embodiments. Specifically, any computer system having at least one resource subject to allocation may employ an embodiment to determine which software processes are to receive access to the resource.

A discrete operating system (OS) (102-1 through 102-3) may be executed to control the processing within each partition 101. Respective applications (106-1 through 106-2) or sets of applications are executed within partitions 101-1 through 101-2. Although two partitions 101 are shown to support applications, any suitable number of partitions for application execution could be employed according to some representative embodiments. Applications 106-1 through 106-2 may support various data center operations of a corporate entity, for example. Within partitions 101-1 and 101-2, performance monitors 103-1 and 103-2 are software processes that monitor operations associated with applications 106-1 through 106-2. For example, performance monitors 103 may examine the length of time required to perform selected types of transactions. Alternatively, performance monitors 103 may monitor the utilization rates associated with the processors, IO peripherals, network interfaces, or other resources assigned to partitions 101-1 and 101-2. The performance metrics gathered by performance monitors 103 are communicated to global workload manager (gWLM) 107.

gWLM 107 is a software process that uses the performance metrics to allocate resources between partitions 101-1 through 101-3 to achieve service level objectives (SLOs) 108. SLOs 108 define the desired operating goals of the applications 106-1 and 106-2 within partitions 101-1 through 101-2. For example, an SLO may be defined to specify the desired length of time to complete a specific type of transaction to equal one millisecond. Alternatively, an SLO may be defined to specify that the utilization rate of a resource should be maintained below 85%. When an application 106 is not achieving an SLO, gWLM 107 may allocate one or several additional processors 121 to the respective virtual partition 101 to ameliorate the underperformance of the application. Any suitable resource could be assigned in this manner such as memory, storage resources, networking resources, operating system resources, and/or the like. SLOs 108 may also store other allocation rules. For example, SLOs 108 may store minimum resource allocations and/or the like, such as an amount of processor capacity assigned to said virtual grid system.

Additional details related to implementing partitions, performance monitors, and workload managers may be found in U.S. Pat. No. 7,140,020, issued on Nov. 21, 2006, having application Ser. No. 10/206,594, entitled "Dynamic management of virtual partition computer workloads through service level optimization," filed Jul. 26, 2002, which is incorporated herein by reference.

Due to the characteristics of applications 106-1 and 106-2, system resources may be idle a significant portion of the time. For example, the loads experienced by data center operations are frequently "bursty," i.e., heavy loads for short periods of time and otherwise idle. Accordingly, system 100 may be used to execute grid virtual system 109 within virtual partition 101-3 to enable the otherwise idle resources to be put to useful activities. Grid virtual system 109 is a software framework that virtualizes physical resources and makes the virtualized resources available to grid applications (such as computational grid 111).

Grid virtual system 109 comprises grid services daemon 110. Grid service daemon 110 may provide support services for virtualization of resources for grid applications. Grid service daemon 110 may register the availability of virtual grid resources with computational grid 111. Grid services daemon 110 may also implement suitable interfaces to enable computational grid 111 to instantiate grid services using known grid interfaces and protocols. Using the instantiated services, computational grid 111 may schedule jobs to support the execution of the distributed application.

The operations of grid services daemon 110 are controlled, in part, by gWLM 107. For example, when an idle resource is deallocated from virtual partitions 101-1 or 101-2, gWLM 107 may make the resource available to virtual partition 101-3 and may communicate a suitable message to grid services daemon 110. In response, grid services daemon 110 may register the availability of virtual resources corresponding to the physical resources with computational grid 111. Computational grid 111 may instantiate one or several grid services through an interface or interfaces exposed by grid services daemon 110. When a grid job is scheduled, grid services daemon 110 may communicate a grid policy update message to gWLM 107. The grid policy update message may cause gWLM 107 to maintain sufficient resources within virtual partition 101-3 to support the quality of service (QoS) characteristics associated with the respective service(s) used for the scheduled job. For example, gWLM 107 may store a minimum resource allocation within SLOs 108 for virtual partition 101-3 that is not subject to reallocation. When a grid job is completed, grid services daemon 110 may notify gWLM 107. gWLM 107 may respond by making resources associated with partition 101-3 available for reallocation to partitions 101-1 and 101-2.

Figure 2:
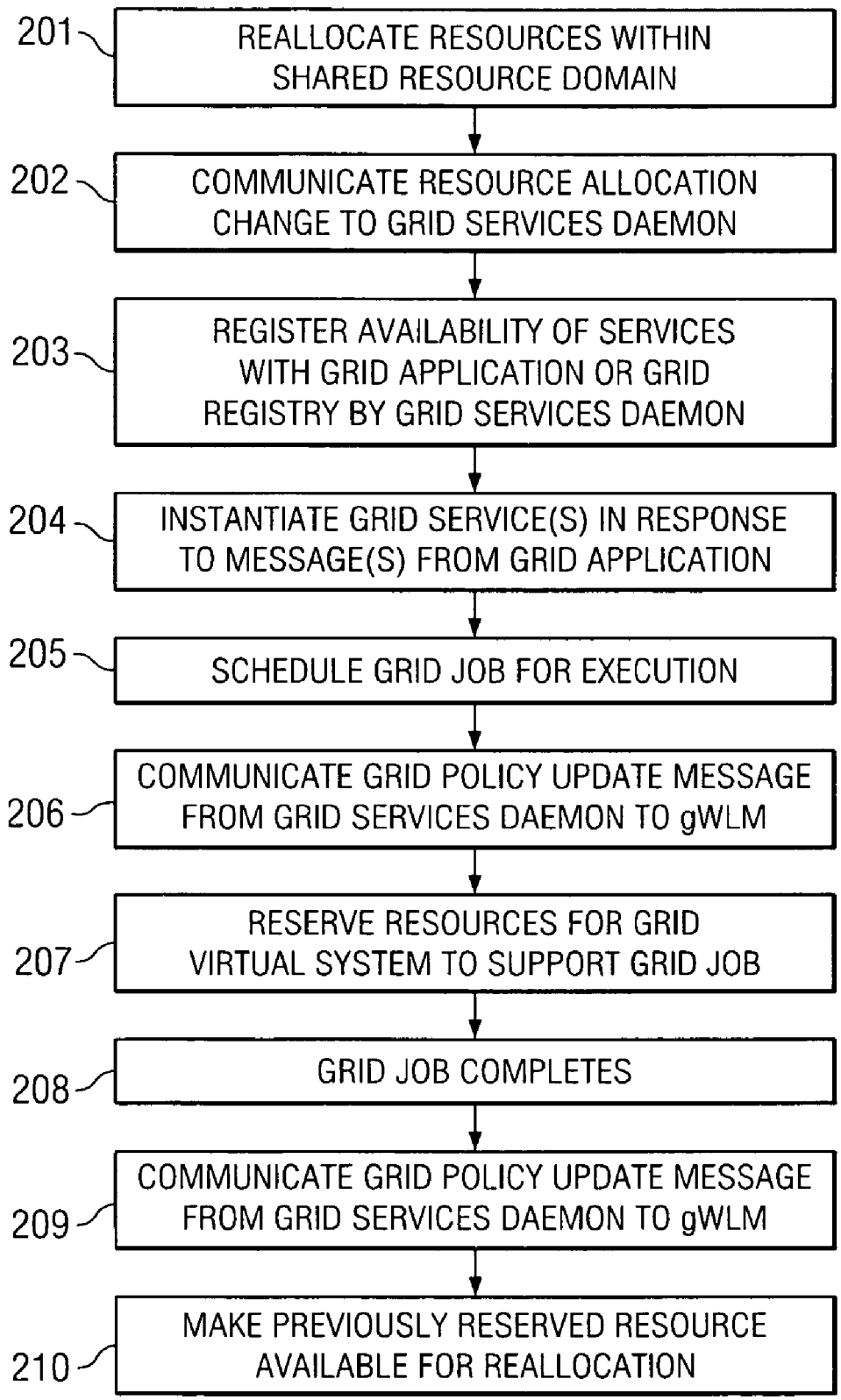
FIG. 2 depicts a flowchart for allocating resources and for providing grid services according to one representative embodiment.

FIG. 2 depicts a flowchart for providing grid services according to one representative embodiment. In block 201, resources are reallocated within a shared resource domain to be virtualized by a grid virtual system. In block 202, the resource allocation change is communicated to a grid services daemon. In block 203, the availability of services is registered with a grid application or grid registry by the grid services daemon. In block 204, one or several grid services are instantiated in response to one or several messages from a grid application.

In block 205, a grid job is scheduled for execution. In block 206, a grid policy update message is communicated from the grid services daemon to a gWLM to indicate that a resource is needed for the scheduled job. In block 207, resources are reserved by the gWLM for the grid virtual system to support the scheduled grid job.

In block 208, the grid job is completed. In block 209, a grid policy update message is communicated from the grid services daemon to the gWLM to indicate that the reserved resources are no longer needed. In block 210, the previously reserved resource(s) is made available for reallocation from the grid virtual system if requested by another partition.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The code segments may be downloaded via computer networks such as the Internet, intranet, etc.

Figure 3:
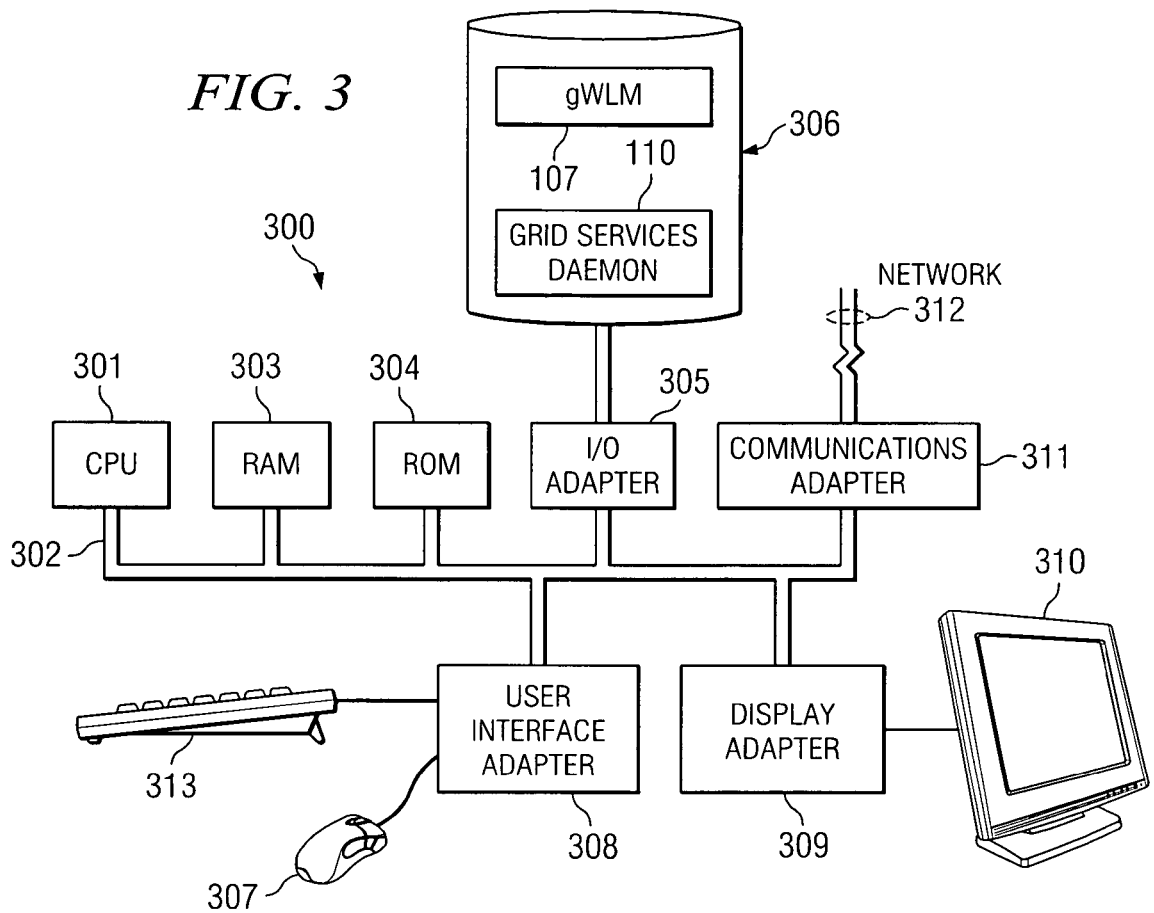
FIG. 3 depicts another system according to one representative embodiment.

FIG. 3 illustrates computer system 300 adapted according to one representative embodiment. Central processing unit (CPU) 301 is coupled to system bus 302. The CPU 301 may be any general purpose CPU. However, the present invention is not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art.

Bus 302 is also coupled to input/output (I/O) controller card 305, communications adapter card 311, user interface card 308, and display card 309. I/O card 305 connects to storage devices 306, such as one or more of hard drive, CD drive, floppy disk drive, tape drive, to the computer system. Storage devices 306 may store the software or executable code for controlling the allocation of resources between computing domains. For example, storage devices 306 may store executable code implementing gWLM 107 and grid services daemon 110 according to one representative embodiment.

Communications card 311 is adapted to couple the computer system 300 to a network 312, which may be one or more of local (LAN), wide-area (WAN), ethernet or Internet network. User interface card 308 couples user input devices, such as keyboard 313 and pointing device 307, to the computer system 300. Display card 309 is driven by CPU 301 to control the display on display device 310.

By dynamically managing a shared resource domain in conjunction with the operations of a grid virtual system, some representative embodiments may provide a number of advantages. Specifically, if a fixed allocation architecture is employed, manual intervention would be necessary to reconfigure resources. If a data center workload or other workload is sufficiently heavy that additional resources would improve performance, system administration intervention to reconfigure resources would most likely not occur in sufficient time to address the heavy workload. Accordingly, some representative embodiments avoid dedicating physical resources to a computational grid so that the resources may be dynamically employed by suitable applications if needed. Additionally, some representative embodiments prevent reallocation operations from unduly interfering with the execution of grid applications. Namely, when a grid job is scheduled, sufficient resources may be reserved to support the scheduled grid job.

What is claimed is:

1. A method for allocating computing resources, comprising:
    executing a plurality of applications and a grid virtual system, wherein said plurality of applications and said grid virtual system are executed within a shared resource domain comprising a plurality of virtual partitions, wherein said grid virtual system is a software framework that virtualizes a physical resource and makes said virtualized resource available to grid applications and wherein at least one application of said plurality of applications are executed within each virtual partition of said plurality of virtual partitions;
    a workload manager for:
        assigning computing resources within said shared resource domain to said plurality of applications to process application transactions;
        monitoring operations associated with said plurality of applications during execution of said plurality of applications for gathering performance metrics;
        dynamically reallocating said computing resources associated with said plurality of applications to said grid virtual system when said computing resources are idle, wherein said performance metrics are used for determining when said computing resources are idle;
    a grid services daemon located within one of said plurality of virtual partition for:
        registering availability of said computing resources in response to said reallocating said computing resources;
        scheduling grid jobs for execution by said computing resources within said grid virtual system; and
        modifying at least one reallocation parameter for said reallocating said computing resources in response to said scheduling.

2. The method of claim 1 wherein said executing comprises:
    providing a respective virtual partition of said plurality of virtual partitions for each of said plurality of applications and said grid virtual system.

3. The method of claim 1 further comprising:
    modifying said at least one reallocation parameter in response to completion of said grid jobs.

4. The method of claim 1 further comprising:
    gathering performance data for said plurality of applications.

5. The method of claim 4 further comprising:
    analyzing said performance data in view of service level objectives, wherein said reallocating said computing resources is performed in response to said analyzing.

6. The method of claim 1 wherein said modifying at least one reallocation parameter comprises:
    defining a minimum resource amount for said grid virtual system to support a respective scheduled grid job.

7. The method of claim 1 wherein said reallocating computing resources comprising:
    reallocating at least one processor from one of said plurality of applications to said grid virtual system.

8. The method of claim 1 further comprising:
    instantiating grid services within said grid virtual system.

9. A computing system, comprising:
    a plurality of computing resources, within a shared resource domain, for executing a plurality of applications and a grid virtual system wherein said grid virtual system is a software framework that virtualizes a physical resource and makes said virtualized resource available to grid applications;
    a computer memory device comprising computer executable instructions stored therein for performing a management process for allocating said plurality of computing resources between said plurality of applications and said grid virtual system, wherein said plurality of applications and said grid virtual system are executed within the shared resource domain comprising a plurality of virtual partitions, and wherein at least one application of said plurality of applications are executed within each virtual partition of said plurality of virtual partitions; and
    a processor that executes said management process, wherein when said management process performs a change in computing resource allocation, said management process monitors operations associated with said plurality of applications during execution of said plurality of applications for gathering performance metrics for determining when said computing resources are idle, said management process communicates a first message to a grid services daemon, within one of the plurality of virtual partitions, associated with said grid virtual system indicating when computing resources are idle, said grid services daemon performs a grid registration operation for registering availability of said plurality of computing resources in response to receiving said first message, said grid services daemon communicates a second message to said management process in response to scheduling a grid job for execution by said plurality of computing resources, and said management process reserves a computing resource for said grid virtual system in response to receiving said second message.

10. The computing system of claim 9 wherein said daemon communicates a third message to said management process when execution of said grid job is completed.

11. The computer system of claim 10 wherein said management process makes said reserved computing resource available for reallocation to one of said plurality of applications in response to said third message.

12. The computer system of claim 9 wherein said management process reallocates said plurality of computing resources for said grid virtual system using a plurality of service level objectives.

13. The computer system of claim 9 wherein said processor further executes at least one performance monitoring process for gathering performance data related to said plurality of applications, wherein said management process analyzes said performance data to reallocate said plurality of computing resources for said grid virtual system.

14. A computer readable storage medium for storing instructions that when executed by one or more processors perform a method for allocating computing resources, said method comprising:
   creating a virtual grid system, wherein said virtual grid system is a software framework that virtualizes a physical resource and makes said virtualized resource available to a plurality of grid applications via communication interfaces;
   a workload manager for:
      monitoring operations associated with a plurality of applications during execution of said plurality of applications for gathering performance metrics;
      dynamically allocating computing resources within a shared resource domain between said plurality of applications and said virtual grid system when said computing resources are idle, wherein said performance metrics are used for determining when said computing resources are idle, wherein said plurality of applications and said grid virtual system are executed within the shared resource domain comprising a plurality of virtual partitions, and wherein at least one application of said plurality of applications are executed within each virtual partition of said plurality of virtual partitions; and
   defining a grid services daemon within one of the plurality of virtual partition to support operations associated with said virtual grid system;
   wherein when said workload manager dynamically allocates computing resources to said virtual grid system, said grid services daemon registers availability of said computing resources for instantiation grid services by a grid application;
   wherein when the grid application schedules a grid job for execution using an instantiated grid service, said grid services daemon communicates a message to said workload manager and said workload manager responds to said message by reserving resources with said virtual grid system to support said grid job.

15. The computer readable storage medium of claim 14 wherein when execution of said grid job is completed, said grid services daemon communicates another message to said workload manager and, in response, said workload manager makes said reserved resources available for reallocation.

16. The computer readable storage medium of claim 14 wherein said workload manager reserves a minimum amount of a resource in response to said message from said grid services daemon.

17. The computer readable storage medium of claim 16 wherein said minimum amount of a resource defines an amount of processor capacity assigned to said virtual grid system.

18. The computer readable storage medium of claim 14 further comprising: performance monitors for gathering performance data related to said plurality of applications.

19. The computer readable storage medium of claim 18 wherein said workload manager allocates resources in response to said performance data.

20. The computer readable storage medium of claim 19 wherein said workload manager compares said performance data to service level objectives.

* * * * *

UNITED STATES PATENT AND TRADEMARK OFFICE
CERTIFICATE OF CORRECTION

PATENT NO.         : 7,765,552 B2                                        Page 1 of 1
APPLICATION NO.    : 10/944227
DATED              : July 27, 2010
INVENTOR(S)        : Troy D. Miller et al.

It is certified that error appears in the above-identified patent and that said Letters Patent is hereby corrected as shown below:

In column 6, line 40, in Claim 9, delete "resources ," and insert -- resources, -- therefor.

Signed and Sealed this
Fourth Day of January, 2011

David J. Kappos
*Director of the United States Patent and Trademark Office*